US008810593B2

(12) United States Patent
Gildfind

(10) Patent No.: US 8,810,593 B2
(45) Date of Patent: Aug. 19, 2014

(54) DISTRIBUTED VISUALIZATION PROCESSING AND ANALYTICS

(75) Inventor: Andrew Gildfind, Brixton (GB)

(73) Assignee: Google Inc., Mountain View, CA (US)

( * ) Notice: Subject to any disclaimer, the term of this patent is extended or adjusted under 35 U.S.C. 154(b) by 785 days.

(21) Appl. No.: 13/076,022

(22) Filed: Mar. 30, 2011

(65) Prior Publication Data

US 2012/0249568 A1    Oct. 4, 2012

(51) Int. Cl.

| | |
|---|---|
| G09G 5/00 | (2006.01) |
| G09G 5/02 | (2006.01) |
| G06F 15/00 | (2006.01) |
| G09G 5/36 | (2006.01) |
| H04N 5/04 | (2006.01) |
| G06K 9/00 | (2006.01) |
| G06K 9/54 | (2006.01) |
| G06F 17/30 | (2006.01) |
| G06F 15/16 | (2006.01) |
| G06F 13/00 | (2006.01) |
| G06F 3/00 | (2006.01) |

(52) U.S. Cl.
USPC ........... 345/581; 345/589; 345/592; 345/501; 345/522; 345/547; 348/552; 707/705; 707/763; 709/201; 711/100; 715/718; 382/162; 382/305

(58) Field of Classification Search
USPC ......... 345/418, 581, 589, 592, 501–504, 522, 345/547–548; 348/211.3, 552; 707/705, 707/722, 756, 781, 793, 803, 812; 709/200, 709/203, 205, 208, 217, 238; 715/718, 715/763–764; 717/100; 711/100, 125; 382/162, 305
See application file for complete search history.

(56) References Cited

U.S. PATENT DOCUMENTS

| | | | |
|---|---|---|---|
| 2004/0049574 | A1* | 3/2004 | Watson et al. ................ 709/224 |
| 2008/0250445 | A1 | 10/2008 | Zigmond et al. |
| 2008/0270164 | A1 | 10/2008 | Kidder et al. |
| 2009/0112648 | A1 | 4/2009 | Lee et al. |
| 2009/0213113 | A1 | 8/2009 | Sim et al. |
| 2011/0029319 | A1 | 2/2011 | Mills et al. |
| 2011/0029376 | A1 | 2/2011 | Mills et al. |
| 2011/0029853 | A1 | 2/2011 | Garrity et al. |
| 2011/0302194 | A1* | 12/2011 | Gonzalez et al. ............ 707/769 |
| 2012/0036533 | A1* | 2/2012 | Ellis et al. ....................... 725/40 |
| 2012/0066065 | A1* | 3/2012 | Switzer ..................... 705/14.53 |
| 2012/0278313 | A1* | 11/2012 | Gonzalez et al. ............ 707/722 |
| 2014/0074854 | A1* | 3/2014 | Gonzalez et al. ............ 707/743 |

OTHER PUBLICATIONS

International Search Report PCT/US2012/030875 mailed on Sep. 25, 2012.

* cited by examiner

*Primary Examiner* — Wesner Sajous
(74) *Attorney, Agent, or Firm* — Fish & Richardson, P.C.

(57) ABSTRACT

Methods, systems, and apparatus, including computer programs encoded on a computer storage medium, for analyzing data. In one aspect, a mixer server receives a request for a visualization of television reporting data, translates the request for the visualization of the television reporting data into sharded requests, and provides each sharded request to a respective shard server. Each shard server processes a respective proper subset of the television reporting data to generate data representing the visualization, and provides the data representing the visualization to the mixer server. The mixer server aggregates the data representing the visualizations received from each of the shard servers, and provides the aggregated data representing the visualization as a response to the request for the visualization of the television reporting data.

23 Claims, 6 Drawing Sheets

DISTRIBUTED VISUALIZATION PROCESSING AND ANALYTICS

BACKGROUND

This specification relates to distributed processing of visualization data.

Consumer behavior analysis provides insight to the behavior and interests of consumers. One way of conducting such analysis is through the analysis of large amounts of low-level data in an online analytics system. For example, television systems facilitate the collection of high volumes of such low-level data. Television advertising systems can have data for viewership and consumer demographics, subscriber data for digital satellite and cable providers, viewership rates for content and time slots, anonymized raw event data, such as channel tune events, etc. Further adding to the possible amount of data is the granularity (e.g., individual interaction events) of many types of television viewership data, also referred to in this specification as "reporting data." For example, television reporting data can span multiple areas of consumer behavior and be relevant in a whole range of applications, ranging from determining advertising effectiveness, interpreting social media behaviors, and driving other Internet applications.

Advertisers want to be able to view visual representations of television reporting data. Viewing the television reporting data and various representations of the television reporting data can permit trend identification and trend prediction, changes in consumer habits and demographics, etc. Such information can prove useful to advertisers. For example, such information can enable an advertiser to identify changes in viewer habits and alter the scheduling of his television advertisements accordingly.

However, generating a visualization of the television reporting data requires the television reporting data to be processed. Many visualization of television reporting data require processing much if not most of the television reporting data. For example, an extensive portion of the television reporting data would have to be processed to generate a visualization of consumer behavior for a specific demographic characteristic.

Generating such visualizations is made difficult by the sheer scale of the underlying data that must be processed. If the data is held in a data store (a relational database for example), it must be transferred to another machine in which it can be visualized. For example, where the visualization is generated by a single processing device, such as a single computer, the time to generate the visualization may be unacceptably long. The data is first transferred to the machine for processing. Transferring of large amounts of data in a timely fashion requires substantial bandwidth. Furthermore, even if the data can be transferred in a timely fashion, few machines other than special purpose supercomputers have enough memory to be able to efficiently process such vast amounts of data.

SUMMARY

In general, one innovative aspect of the subject matter described in this specification can be embodied in methods that include the actions of receiving, at a mixer server, a request for a visualization of television reporting data, the request including parameter data specifying the television reporting data to be used to generate the visualization of the television reporting data; translating, at the mixer server, the request for the visualization of the television reporting data into sharded requests for the visualization of the television reporting data and providing each sharded request to a respective shard server, wherein each shard server processes a respective proper subset of the television reporting data; at each shard server: generating data representing the visualization from the proper subset of the television reporting data processed by the shard server and from the parameter data, and providing the data representing the visualization to the mixer server; aggregating, at the mixer server, the data representing the visualizations received from each of the shard servers; and providing the aggregated data representing the visualization as a response to the request for the visualization of the television reporting data. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving from each of a plurality of shard servers, in response to a request for a visualization of television reporting data, the request including parameter data specifying the television reporting data to be used to generate the visualization of the television reporting data, data representing the visualization generated by the shard server from a proper subset of the television reporting data processed by the shard server, wherein the visualization data includes: pixel data including color data specifying a color, transparency data specifying transparency, and depth data specifying a depth for each of a plurality of pixels in the visualization of the television reporting data; aggregating, at the mixer server, the pixel data from each shard sever in an order based upon the depth of the pixels specified by the depth data received from each of the shard servers to form aggregated data representing the visualization; and providing the aggregated data representing the visualization as a response to the request for the visualization of the television reporting data. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The generated visual representations of the television reporting data are fault tolerant with respect to partial data loss, and thus the loss of a shard server does not disable the processing of a visualization request. The generation of visualizations of television reporting data can occur without transfer of all of the television reporting data to any one processing device, thus conserving bandwidth and lowering processing requirements of each individual shard server. This also lowers the processing requirements of the client device used to view the final visualization, and allows client performance to scale with the size of rendered images, rather than the amount of data used to compute the images.

Shard servers can be added to maintain the amount of amount of data transferred over a network to a maximum size, thereby maintaining the processing requirements of each individual shard server even when the amount of television reporting data increases. The scalability of the system allows for visualizations of arbitrarily large datasets by adding more shards, while at the same time allowing for the amount of data to be transferred to the client to be based on a function of the size of the image rather than the underlying data processed.

Additionally, the underlying data need not be transferred out of the address space in which it is held; instead, the visualization of the underlying data occurs in situ. As only pixel data of the visualization are transferred out of the data store, the network load scales as a function of the rendered image size, and not the underlying data size.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
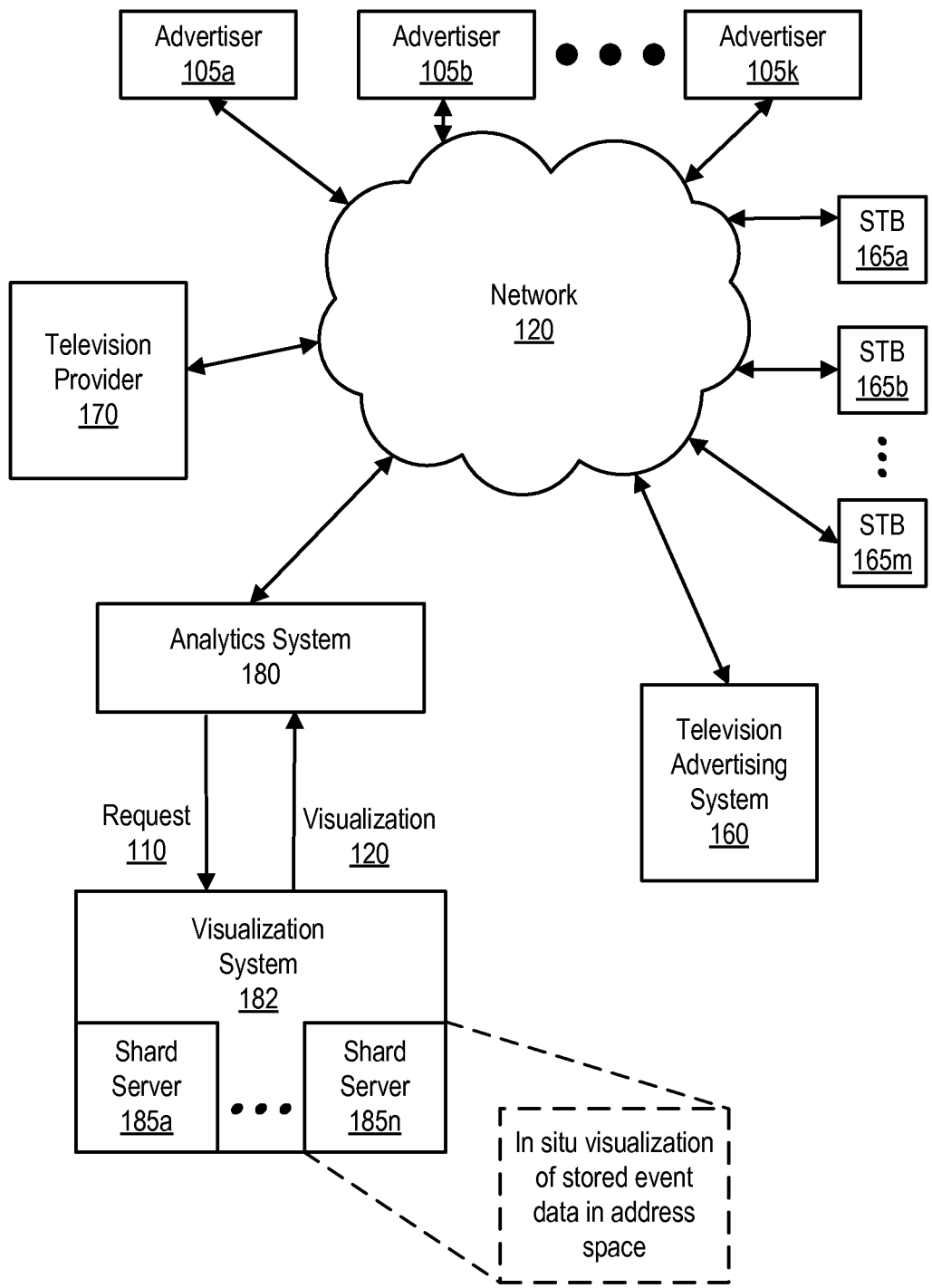
FIG. 1 is a block diagram of an environment in which a visualization system is utilized.

FIG. 1 is a block diagram of an environment 100 in which a visualization system 182 is utilized. The network 120 can be composed of multiple different types of networks. Example network types include local area networks (LANs), wide area networks (WANs), telephonic networks, and wireless networks (e.g., 802.11x compliant networks, satellite networks, cellular networks, etc.). Although only three advertisers (105a, 105b, and 105k) and three television processing devices (165a, 165b, and 165m), the television advertising environment 100 may include many more advertisers, television processing devices and television advertising systems.

The television provider 170 can, for example, be a cable network provider, a satellite television provider, or other provider of television programming. The television processing devices 165a, 165b and 165m (collectively referenced as 165) are devices that that decode encoded content the television provider 170 provides, enabling the content to be viewed upon a television device. For example, the decoder provided by a digital satellite provider is a set top box that enables the content provided by the digital satellite provider to be viewed upon a television device.

The television advertising system 160 can receive television advertisements and advertisement campaign data from the advertisers 105, and coordinates the provisioning of the advertisements with the television provider 170. The television advertising system 160, for example, identifies relevant advertising for airtime advertisement spots of the television provider 170. The television advertising system 160 can, for example, select candidate advertisements to air during an advertisement availability based on account advertiser bids, budgets, and any quality metrics that have been collected, e.g., conversions, viewer actions, impressions, etc. For example, advertisements can be selected to air during the advertisement availability according to a computer-implemented auction.

The television processing devices 165 can report back to the television provider system 170 various information, such as channel tune records that describe a channel change from a first channel to a second channel, the time of the change, and, optionally, the content being broadcast on one or both channels during the channel tune. The television processing devices 165 are also associated with viewer demographic information based upon subscriber information. The television provider system 170 can provide the reporting data provided by the television processing devices 165 to the television advertising system 160.

The advertisers 105 often need to review the performance of their advertising campaigns to determine the effectiveness of the campaigns. There is a variety of tools that the advertisement management system 160 provides for reviewing the performance of an advertising campaign. One such tool is a visualization of reporting data. For example, the advertisers 105 may desire to view various visual representations of pertinent business information, consumer information, consumer behavior, viewer demographics, etc. One such visual representation is a three-dimensional scatter plot showing the number of households by economic bracket and geographic location.

In some implementations, an analytics system 180 implements the visualization system 182. The analytics system 180 can be a system that is integrated with the television provider 170, the advertising system 160, or a third party system in data communication with the advertising system and the television provider system 160. In the examples that follow, the analytics system 180 is described in the context of being integrated into the advertising system 160.

To receive visualization reports, the advertisers 105 send a request 110 to the advertising system 160 for a visualization 120 of the television reporting data. A request 110 includes data specifying a type of visualization and parameter data specifying the television reporting data to be used to generate the visualization 120 of the television reporting data. For example, a request could specify a scatter plot of the household incomes within a specific geographic location; a plot of specific demographics in viewership over time; and other visualizations.

The visualization 120 of the television reporting data is composed of data. In some implementations, a visualization 120 is composed of pixel data. A pixel is a basic unit of composition of an image on a television screen, computer monitor, or similar display. The visualization system 182 includes shard servers 185. Sharding is a method of partitioning a set of data, and each partition is referred to as a shard. Each shard server 185 is responsible for processing a shard of the television reporting data, i.e., a subset of the television reporting data. While each shard server 185 stores and processes only a subset of the television reporting data, collectively, the shard servers 185 store and process all of the television reporting data.

Each shard server 185 can generate a visualization of its respective subset of television reporting data. Upon receiving a request 110, the visualizing system 182 instructs each shard server 185 (or a subset of the shard servers 185, depending on the request) to generate the requested visualization of the shard server's respective television reporting data. In response, each shard server 185 generates the requested visualization of its respective subset of television reporting data, and provides its respective data in response to the request. The visualizing system 182 aggregates the data of the visualizations from the shard servers 185 to produce the data of the requested visualization 120, and provides the aggregated data representing the visualization 120 to the requesting advertiser 105.

Figure 2:
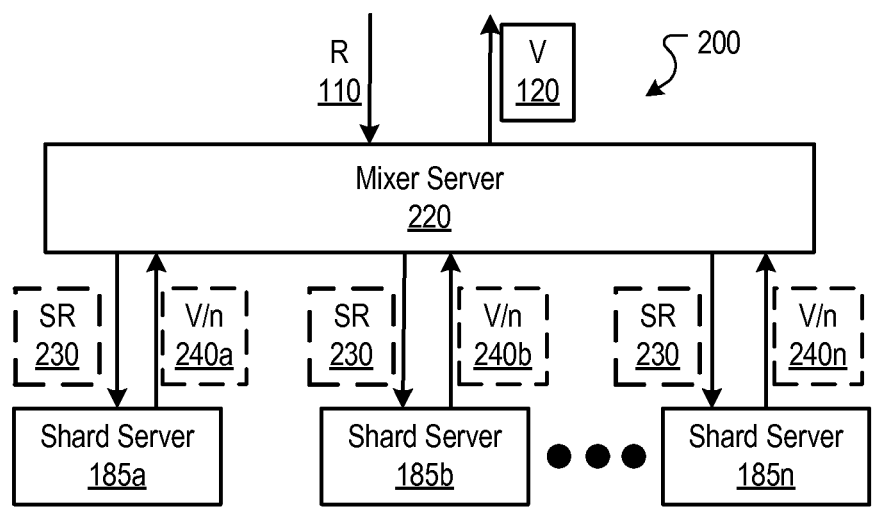
FIG. 2 is a block diagram depicting a mixer server and the shard servers.

FIG. 2 is a block diagram 200 depicting a mixer server 220 and the shard servers 185. In some implementations, the visualizing system 182 can be represented as a tree with the leaf nodes corresponding to the shard servers, and a root node corresponding to the mixer server 220. One or more intermediate layers can be included, where each intermediate layer corresponds to another mixer server. For ease of illustration, only one mixer server is shown.

The mixer server 220 receives the request 110 as input and generates data representing a visualization 120 as output. The mixer server's generation of the data representing a visualization 120 is further explained with reference to FIG. 3. The mixer server 220 translates the request 110 into a plurality of sharded requests 230, and provides each shard server 185 with a respective sharded request 230.

A sharded request 230 is the translation of the request 110 into a request configured for the shard servers 185. The sharding of a request can depend on how the television reporting data are distributed to the shard servers 185. For example, assume the television reporting data are arranged in ascending order according to set top box identifiers, and are distributed to each shard server 185 so that each shard server 185 has a subset of data corresponding to a subset of contiguously ascending identifiers. In this arrangement, the request 110 is sharded so that each shard request 230 specifies the processing of television reporting data for the corresponding ascending identifiers of the shard server 185. In other limitations, shard request 230 may simply be a duplicate (i.e., a copy of) the request 110. Each sharded request 230 also includes the parameter data of the request 110.

In response to receiving a sharded request 230, each shard server 185 generates data representing the requested visualization from a respective proper subset of the television reporting data that the shard server 185 stores and processes. In some implementations, each shard server's data is a non-overlapping subset of the television data. For example, the television reporting data is divided into as many non-overlapping subsets as there are shard servers 185.

In some implementations, each shard server's respective proper subset of television reporting data is a sparsely populated subset spanning the entire television reporting data. In other words, each shard server contains data mapped across the same dimensions and limits of the television reporting data in each other shard server 185. A consequence of this distribution of data to the shard servers 185 is a minimization of degradation of visualizations 120 in response to shard server failures. This is because with this data distribution, the loss of data of a visualization 240 from a shard server 185 failure corresponds to a loss of data distributed over the entire television reporting data.

Each shard server 185 processes the sharded request 230 and generates data 240 representing the visualization from the proper subset of the television reporting data. Each shard server 185 and passes the data 242 the mixer server 220, which then combines the respective sets of data 240 into the visualization 120 of television reporting data. The visualization 120 is then provided to the client device from which the request 110 was received. In some of limitations, the visualization data 120 is an aggregation of the data 240 received from each shard server 185. The processing of the shard request in the generation of visualization data in the shard server 185 is described more detail below.

Figure 3:
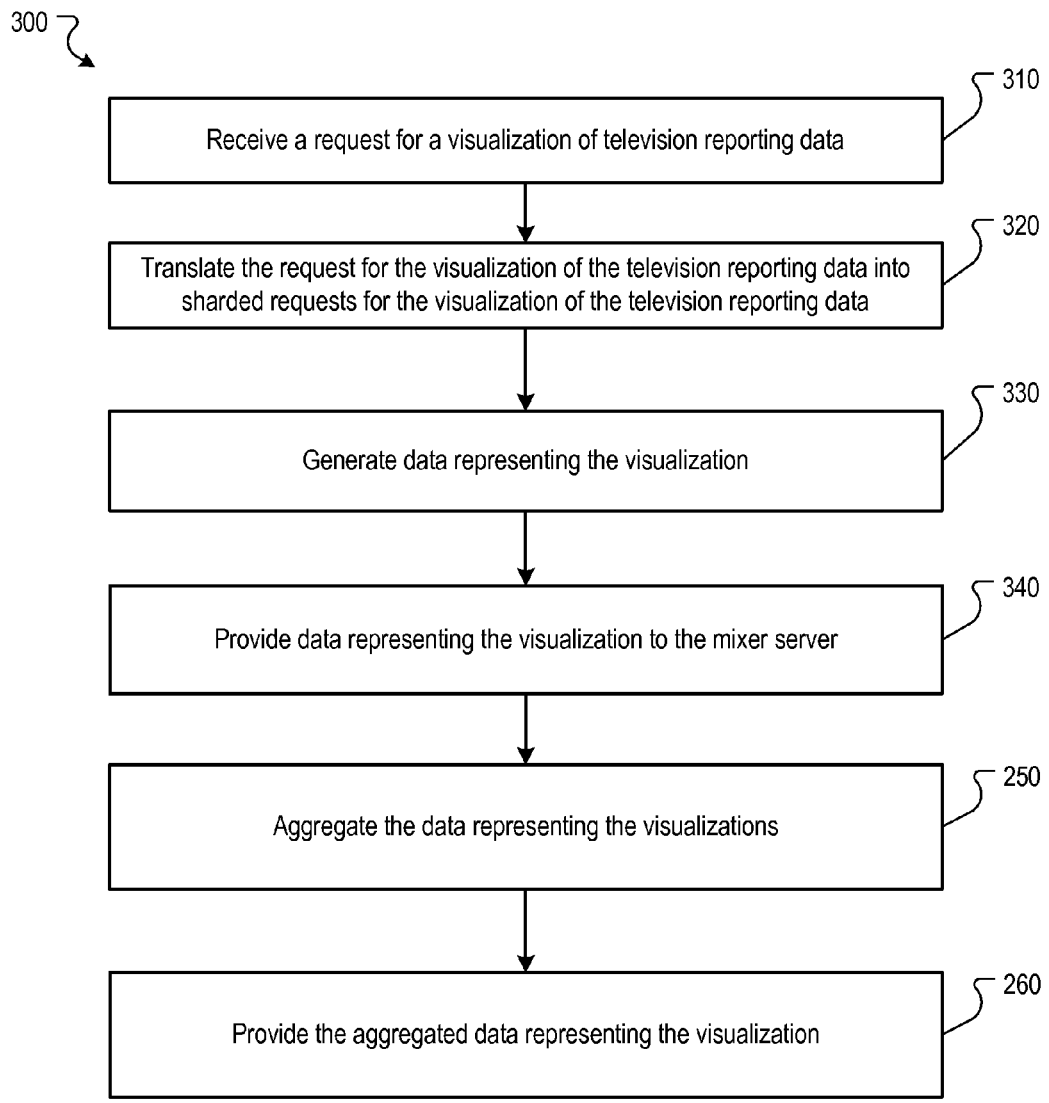
FIG. 3 is a flow diagram illustrating an example process for generating a visualization of television reporting data.

FIG. 3 is a process flow diagram illustrating a process flow 300 for generating a visualization 120 of television reporting data. The mixer server 220 receives a request 110 for a visualization of television reporting data (310). The request 110 is typically received from an advertiser 105. The request 110 includes parameter data specifying the television reporting data to be used to generate the visualization 120.

The request 110 for the visualization of the television reporting data is translated into sharded requests 230 for the visualization of the television reporting data. As previously described, the mixer server 220 transforms the request 110 into the sharded requests 230. The mixer server 220 provides each sharded request 230 to a respective shard server 185.

Each shard server 185 generates data representing the visualization 240 (320) from the proper subset of the television reporting data processed by the shard server 185 and the parameter data. In some implementations, each shard server 185 generates data representing the visualization 240 by generating and storing pixel data into the shard server's rendering buffer. A rendering buffer is data storage that stores data until further processing or transferred out of the rendering buffer. The pixel data can include color data specifying a color, transparency data specifying transparency, and depth data specifying a depth (e.g., a z-depth) for each of a plurality of pixels in the visualization 240 of the television reporting data.

In some implementations, each shard server 185 generates data representing the visualization 240 by performing one or more openGL calls to a hardware rendering subsystem, which then processes the proper subset of the television reporting data stored in the shard server 185 memory. The one or more openGL procedure calls render the data of the visualization 240 from the proper subset of the television reporting data processed by the shard server 185 and from the parameter data. OpenGL is a standard specification that defines a cross-language and cross platform procedural API for writing applications that produce two or three dimensional computer generated images. In another implementation, a custom renderer running with the address space of the shard server 185 is used to generate data representing the visualization.

Each shard server 185 provides data representing its visualization 240 to the mixer server 220 (340). In some implementations, a shard server 185 performs a transform on the data representing the visualization 240 before providing the data to the mixer server 240. The transform on the data representing the visualization 240 is described with reference to FIG. 5.

The mixer server 220 aggregates the data representing the visualizations 240 received from the shard servers 185 (350). In some implementations, the data representing the visualizations 240 received from the shard servers 185 is aggregated in an order based upon a depth of the pixels. The order of aggregation is determined by first ordering the pixel data of all the visualizations 240 based upon the depth of each pixel. The pixels are then combined in an order based upon the ordering of the pixel data. Combining the pixels in an order based upon the depth of the pixels can preserve the visual information of the visualizations 240. For example, a non-transparent pixel visually in front of other pixels can prevent the display of the other pixels. Combining the pixels in order of depth prevents pixels at a greater depth from improperly covering pixels at a lesser depth.

The mixer server 220 provides the aggregated data representing the visualization 120 as a response to the request 110 for the visualization of the television reporting data (360). In some implementations, the aggregated data representing the visualization 120 defines a visualization space of two or more dimensions, each dimension having a respective minimum and maximum value. In this case, data of the visualizations 240 generated by the shard servers 185 are bounded only by the respective minimum and maximum values (e.g., the reporting data processed by each shard server may be sparsely distributed over the space that encloses the reporting data). For example, the data representing a scatter plot of household incomes for the years of 2005 to 2009 defines a space having a minimum year value, 2005, and a maximum year value, 2009. Similarly, the space will also have a minimum income value and a maximum income value. In these implementations, because the data of the visualization of the scatter plot results from an aggregation of the data of the visualizations from the shard servers, the data from the visualizations from shard servers also have the same boundaries.

Figure 4:
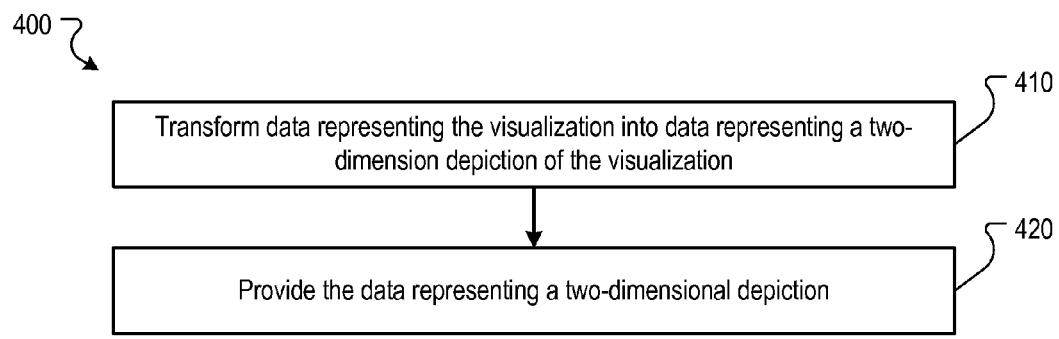
FIG. 4 is a flow diagram illustrating an example process for transforming sharded visualizations of television reporting data into two dimensional depictions of the sharded visualizations of television reporting data.

FIG. 4 is a process flow diagram illustrating a process flow 400 for transforming the visualizations 240 of television reporting data into two-dimensional depictions of the visualizations 240 of television reporting data. In some implementations, the data representing a visualization 240 is transformed into data representing a two-dimensional depiction of the visualization 240 (410). Each shard server 185 utilizes the same projection matrix when performing the transform. A projection matrix is a matrix that defines the translation of three-dimensional geometry into a two-dimensional image space. For example, a computer monitor can display only in two dimensions. However, images on a computer monitor can appear three-dimensional. A projection matrix can be used to transform three-dimensional such that its depiction on a computer monitor visually represents three dimensions. The shard servers 185 utilize the same projection matrix by having the parameters controlling the renderer set consistently across each shard to ensure the image results will be compatible.

The data representing a two-dimensional depiction of the visualization 240 is provided to the mixer server 220 (420). The mixer server 220 thus does not have to perform a transform because the shard servers 185 have already performed the transform using the projection matrix. Instead, the mixer server 220 aggregates the data as previously explained.

In other implementations, the mixer server 220 can implement the projection matrix transform described above. In these implementations, the shard servers 185 do not need to perform the projection matrix transform.

Figure 5:
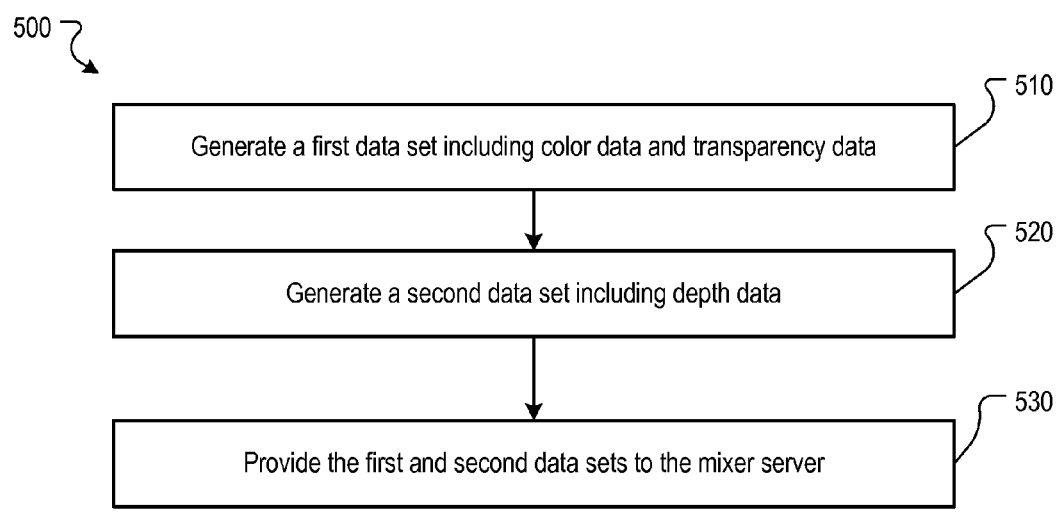
FIG. 5 is a flow diagram illustrating another example process for generating a sharded visualization of television reporting data.

FIG. 5 is a process flow diagram illustrating an example process flow 500 for generating data representing a visualization of television reporting data. In some implementations, two sets of data are provided—a first set of data including the color and transparency information of the three dimensional visualization, and a second set of data including the depth information of the three dimensional visualization. This information is used to correctly composite the intermediate renderings from the shard servers at a receiving mixer servers.

In some implementations, a shard server 185 generates color data specifying a color, transparency data specifying transparency, and depth data specifying a depth for each pixel in the visualization of the television reporting data. The shard server 185 generates data representing the first set of data (510). The data of the first data set includes color data specifying a color and transparency data specifying transparency for each of a plurality of pixels in the visualization of the television reporting data. The shard server 185 generates data representing the second data set (520). Unlike the data of the first data set, the data of the second data set includes depth data for each of a plurality of pixels in the visualization of the television reporting data. The depth data specifies a depth for each of a plurality of pixels in the first visualization.

Each shard server 185 supplies the first and second data sets to the mixer server 220 (530). The mixer server 220 separately aggregates the data of the first data sets and the second data sets. The mixer server 220 uses the depth information to combine the intermediate images received from the shard servers.

The use of separate first and second data sets is an example implementation, and other image processing techniques can be used. For example, in some implementations, color information is encoded in one data set, and transparency and depth are encoded in another data set. More generally, any processing technique that facilities the combination of multiple images of an image space and that preserves in the aggregate the correct image and depth distributions can be used.

The mixer server provides the aggregated data representing the first data sets and the aggregated data representing the second data sets as a response to the request 110 for the visualization 120 of the television reporting data.

Figure 6:
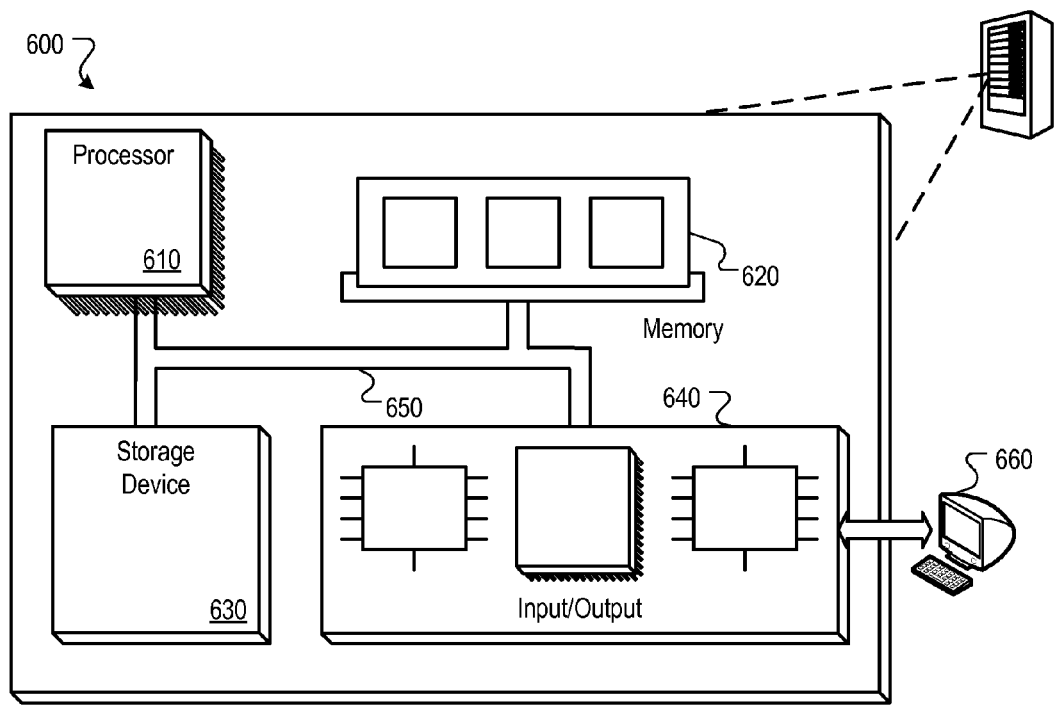
FIG. 6 is a block diagram of an example computer system that can be used to implement the processes and systems described with respect to FIGS. 1-5.

FIG. 6 is a block diagram of an example computer system 600 that can be used to implement the processes and systems described with respect to FIGS. 1-4. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The visualization system 182 can be realized by instructions that upon execution cause one or more processing devices to carry out the processes and functions described above. The visualization system 182 can be implemented in a distributed manner over a network, such as a server farm, or can be implemented in a single computer device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, at a mixer server, a request for a visualization of television reporting data, the request including parameter data specifying the television reporting data to be used to generate the visualization of the television reporting data;
   translating, at the mixer server, the request for the visualization of the television reporting data into sharded requests for the visualization of the television reporting data and providing each sharded request to a respective shard server, wherein each shard server processes a respective proper subset of the television reporting data;
   at each shard server:
      generating data representing the visualization from the proper subset of the television reporting data processed by the shard server and from the parameter data; and
      providing the data representing the visualization to the mixer server;
   aggregating, at the mixer server, the data representing the visualizations received from each of the shard servers; and
   providing the aggregated data representing the visualization as a response to the request for the visualization of the television reporting data.

2. The method of claim 1, wherein providing the data representing the visualization to the mixer server comprises:
   transforming, using a projection matrix, the data representing the visualization into data representing a two-dimensional depiction of the visualization of the television reporting data, wherein each shard server utilizes a same projection matrix; and
   providing the data representing a two-dimensional depiction of the visualization of the television reporting data to the mixer server.

3. The method of claim 1, wherein generating data representing the visualization at each shard server comprises: storing, in a rendering buffer in the shard server, pixel data including color data specifying a color, transparency data specifying transparency, and depth data specifying a depth for each of a plurality of pixels in the visualization of the television reporting data.

4. The method of claim 3, wherein aggregating, at the mixer server, the data representing the visualizations received from each of the shard servers comprises:
   aggregating the pixel data from each shard sever in an order based upon the depth of the pixels.

5. The method of claim 1, wherein:
   the aggregated data representing the visualization defines a visualization space of two or more dimensions, each dimension having a respective minimum and maximum value; and
   at each shard server, generating data representing the visualization from the proper subset of the television reporting data processed by the shard server and from the parameter data comprises generating data representing the visualization and that is bounded only by the respective maximum and minimum values.

6. The method of claim 1, wherein generating data, at each shard server, representing the visualization from the proper subset of the television reporting data processed by the shard server and from the parameter data comprises:
   performing, at each shared server and for the proper subset of the television reporting data processed by the shard server, one or more of openGL calls to a rendering subsystem, the one or more openGL calls causing the rendering subsystem to render data representing the visualization from the proper subset of the television reporting data processed by the shard server and from the parameter data.

7. The method of claim 1, wherein generating data representing the visualization at each shard server comprises generating a first data set and a second data set, wherein:
   the first data set including color data specifying a color and transparency data specifying transparency for each of a plurality of pixels in the visualization; and
   the second data set including depth data specifying a depth for each of a plurality of pixels in the visualization.

8. The method of claim 7, wherein the first data set and the second data set are in Portable Network Graphics format.

9. The method of claim 4, wherein aggregating the pixel data from each of the shard sever in an order based upon the depth of the pixels comprises:
   determining an ordering of the pixel data from the shard servers, the ordering based on the depth of each pixel; and
   combining the pixel data in an order based upon the ordering of the pixel data.

10. A system, comprising:
    a mixer server having a processing subsystem and a memory subsystem, the memory subsystem storing instructions executable by the processing subsystem that are configured to cause the mixer server to perform operations comprising:

receive a request for a visualization of television reporting data, the request including parameter data specifying the television reporting data to be used to generate the visualization of the television reporting data;

translate the request for the visualization of the television reporting data into sharded requests for the visualization of the television reporting data;

provide each sharded request to a respective shard server;

aggregate data representing the visualizations received from each of the shard servers in response to each respective sharded request; and provide the aggregated data representing the visualization as a response to the request for the visualization of the television reporting data; and a plurality of shard servers, each shard server having a processing subsystem and a memory subsystem, the memory subsystem storing a respective proper subset of the television reporting data, and storing instructions executable by the processing subsystem that are configured to cause the shard server to perform operations comprising:

generate data representing the visualization from the proper subset of the television reporting data processed by the shard server and from the parameter data; and provide the data representing the visualization to the mixer server.

11. The system of claim 10, wherein each shard server generates data representing the visualization at each shard server by storing, in a rendering buffer in the shard server, pixel data including color data specifying a color, transparency data specifying transparency, and depth data specifying a depth for each of a plurality of pixels in the visualization of the television reporting data.

12. The system of claim 11, wherein the mixer server aggregates the pixel data from each shard sever in an order based upon the depth of the pixels.

13. The system of claim 10, wherein:

the aggregated data representing the visualization defines a visualization space of two or more dimensions, each dimension having a respective minimum and maximum value; and each shard server generates data representing the visualization that is bounded only by the respective maximum and minimum values.

14. The system of claim 10, wherein each shard server:

transforms, using a projection matrix, the data representing the visualization into data representing a two-dimensional depiction of the visualization of the television reporting data, wherein each shard server utilizes a same projection matrix; and provides the data representing a two-dimensional depiction of the visualization of the television reporting data to the mixer server.

15. A system, comprising:

means for translating a request for a visualization of television reporting data into sharded requests, the request for the visualization including parameter data specifying the television reporting data to be used to generate the visualization of the television reporting data request for the visualization of the television reporting data, providing each sharded request to a respective means for generating visualizations, and aggregating data representing the visualizations received from each of the respective means for generating visualizations; and respective means for generating visualizations, each respective means for generating visualization generating data representing the visualization from a proper subset of the television reporting data processed by the respective means for generating visualizations.

16. Software stored in a data storage apparatus and comprising instructions, the instructions configured to:

cause a mixer server to perform operations comprising:

receive a request for a visualization of television reporting data, the request including parameter data specifying the television reporting data to be used to generate the visualization of the television reporting data;

translate the request for the visualization of the television reporting data into sharded requests for the visualization of the television reporting data;

provide each sharded request to a respective shard server;

aggregate data representing the visualizations received from each of the shard servers in response to each respective sharded request; and provide the aggregated data representing the visualization as a response to the request for the visualization of the television reporting data; and cause each of a plurality of shard server having a processing subsystem and a memory subsystem, the memory subsystem storing a respective proper subset of the television reporting data, and storing instructions executable by the processing subsystem that are configured to cause the shard server to perform operations comprising:

generate data representing the visualization from the proper subset of the television reporting data processed by the shard server and from the parameter data; and provide the data representing the visualization to the mixer server.

17. A method performed by data processing apparatus, the method comprising:

receiving at a mixer server and from each of a plurality of shard servers, in response to a request for a visualization of television reporting data, the request including parameter data specifying the television reporting data to be used to generate the visualization of the television reporting data, data representing the visualization generated by the shard server from a proper subset of the television reporting data processed by the shard server, wherein the visualization data includes:

pixel data including color data specifying a color;

transparency data specifying transparency; and depth data specifying a depth for each of a plurality of pixels in the visualization of the television reporting data;

aggregating, at the mixer server, the pixel data from each shard sever in an order based upon the depth of the pixels specified by the depth data received from each of the shard servers to form aggregated data representing the visualization; and providing the aggregated data representing the visualization as a response to the request for the visualization of the television reporting data.

18. The method of claim 17, wherein aggregating the pixel data from each of the shard sever in an order based upon the depth of the pixels comprises:

determining an ordering of the pixel data from the shard servers, the ordering based on the depth of each pixel; and combining the pixel data in an order based upon the ordering of the pixel data.

19. The method of claim 17, wherein:

the aggregated data representing the visualization defines a visualization space of two or more dimensions, each dimension having a respective minimum and maximum value; and the data representing the visualization received from each shard server comprises data that is bounded only by the respective maximum and minimum values.

20. A system, comprising:

a mixer server having a processing subsystem and a memory subsystem, the memory subsystem storing instructions executable by the processing subsystem that are configured to cause the mixer server to perform operations comprising:

receiving from each of a plurality of shard servers, in response to a request for a visualization of television reporting data, the request including parameter data specifying the television reporting data to be used to generate the visualization of the television reporting data, data representing the visualization generated by the shard server from a proper subset of the television reporting data processed by the shard server, wherein the visualization data includes:

pixel data including color data specifying a color;

transparency data specifying transparency; and depth data specifying a depth for each of a plurality of pixels in the visualization of the television reporting data;

aggregating, at the mixer server, the pixel data from each shard sever in an order based upon the depth of the pixels specified by the depth data received from each of the shard servers to form aggregated data representing the visualization; and providing the aggregated data representing the visualization as a response to the request for the visualization of the television reporting data.

21. The system of claim 20, wherein aggregating the pixel data from each of the shard sever in an order based upon the depth of the pixels comprises:

determining an ordering of the pixel data from the shard servers, the ordering based on the depth of each pixel;

combining the pixel data in an order based upon the ordering of the pixel data.

22. The system of claim 20, wherein:

the aggregated data representing the visualization defines a visualization space of two or more dimensions, each dimension having a respective minimum and maximum value; and the data representing the visualization received from each shard server comprises data that is bounded only by the respective maximum and minimum values.

23. Software stored in a data storage apparatus and comprising instructions, the instructions configured to cause a mixer server to perform operations comprising:

receiving from each of a plurality of shard servers, in response to a request for a visualization of television reporting data, the request including parameter data specifying the television reporting data to be used to generate the visualization of the television reporting data, data representing the visualization generated by the shard server from a proper subset of the television reporting data processed by the shard server, wherein the visualization data includes:

pixel data including color data specifying a color;

transparency data specifying transparency; and depth data specifying a depth for each of a plurality of pixels in the visualization of the television reporting data;

aggregating, at the mixer server, the pixel data from each shard sever in an order based upon the depth of the pixels specified by the depth data received from each of the shard servers to form aggregated data representing the visualization; and providing the aggregated data representing the visualization as a response to the request for the visualization of the television reporting data.

\* \* \* \* \*